US012570142B2

(12) United States Patent
Dybro

(10) Patent No.: US 12,570,142 B2
(45) Date of Patent: Mar. 10, 2026

(54) DIRECTIONAL BIASED DRIVE CONTROL SYSTEM AND METHOD

(71) Applicant: CNH Industrial America LLC, New Holland, PA (US)

(72) Inventor: Niels Dybro, Muscatine, IA (US)

(73) Assignee: CNH Industrial America LLC, New Holland, PA (US)

( * ) Notice: Subject to any disclaimer, the term of this patent is extended or adjusted under 35 U.S.C. 154(b) by 476 days.

(21) Appl. No.: 18/108,455

(22) Filed: Feb. 10, 2023

(65) Prior Publication Data

US 2024/0270068 A1 Aug. 15, 2024

(51) Int. Cl.
| | |
|---|---|
| B60K 17/35 | (2006.01) |
| B60K 7/00 | (2006.01) |
| B60K 17/346 | (2006.01) |
| B60W 10/14 | (2012.01) |
| B62D 11/00 | (2006.01) |
| B62D 11/04 | (2006.01) |
| B62D 11/08 | (2006.01) |

(52) U.S. Cl.
CPC ............ B60K 17/35 (2013.01); B60K 7/0007 (2013.01); B60K 17/3462 (2013.01); B62D 11/003 (2013.01); B62D 11/04 (2013.01); B62D 11/08 (2013.01)

(58) Field of Classification Search
CPC ............................... B60K 17/35; B60W 10/14
See application file for complete search history.

(56) References Cited

U.S. PATENT DOCUMENTS

| | | | | |
|---|---|---|---|---|
| 5,099,944 A | * | 3/1992 | Kageyama | B60K 23/0808 |
| | | | | 701/69 |
| 5,742,917 A | * | 4/1998 | Matsuno | B60K 23/0808 |
| | | | | 701/88 |
| 6,059,065 A | * | 5/2000 | Takeda | B60K 23/0808 |
| | | | | 701/69 |
| 2003/0216212 A1 | | 11/2003 | Rodeghiero | |
| 2005/0159264 A1 | * | 7/2005 | Puiu | F16D 28/00 |
| | | | | 475/198 |

(Continued)

FOREIGN PATENT DOCUMENTS

CN       104149610 B     11/2016

OTHER PUBLICATIONS

European Search Report Issued in Corresponding Application No. EP24156824.5 Dated Jul. 1, 2024 (9 pages).

*Primary Examiner* — Long T Tran
(74) *Attorney, Agent, or Firm* — Dority & Manning, P.A.

(57) ABSTRACT

A drive system for a work vehicle includes a chassis, a first front wheel and a second front wheel operably coupled with a front axle assembly, and a first rear wheel and a second rear wheel operably coupled with a rear axle assembly. At least one wheel sensor can be associated with the first front wheel, the second front wheel, or both. A transfer case can be operably coupled with a front differential input shaft and a rear differential input shaft. A computing system can be operably coupled with the at least one wheel sensor and the transfer case. The computing system can be configured to receive an input related to a commanded vehicle trajectory, determine a correlation of a front axle reference point to a rear axle reference point, and determine a differential shaft ratio based at least partially on the correlation.

18 Claims, 7 Drawing Sheets

(56) References Cited

U.S. PATENT DOCUMENTS

| | | | |
|---|---|---|---|
| 2006/0052198 A1* | 3/2006 | Namuduri | F16D 37/02 |
| | | | 475/5 |
| 2007/0158160 A1* | 7/2007 | Puiu | F16D 28/00 |
| | | | 192/70.23 |
| 2014/0038763 A1* | 2/2014 | Knickerbocker | B60K 17/26 |
| | | | 475/221 |
| 2014/0039767 A1* | 2/2014 | Jensen | B60K 23/0808 |
| | | | 701/50 |
| 2014/0039772 A1* | 2/2014 | Jensen | B60K 23/0808 |
| | | | 701/69 |

* cited by examiner

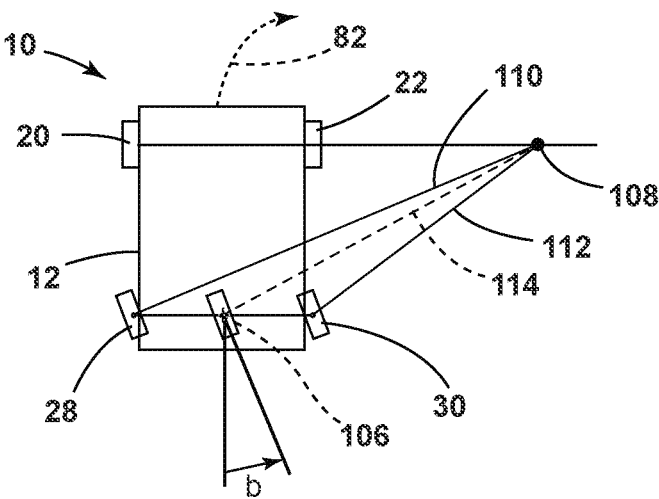
FIG. 3
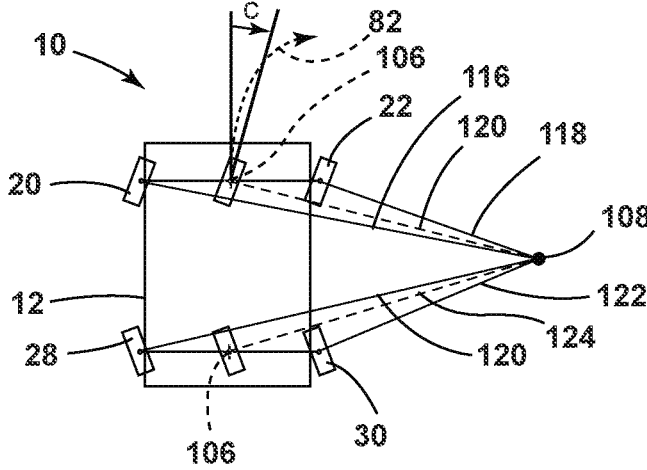
FIG. 4
FIG. 5

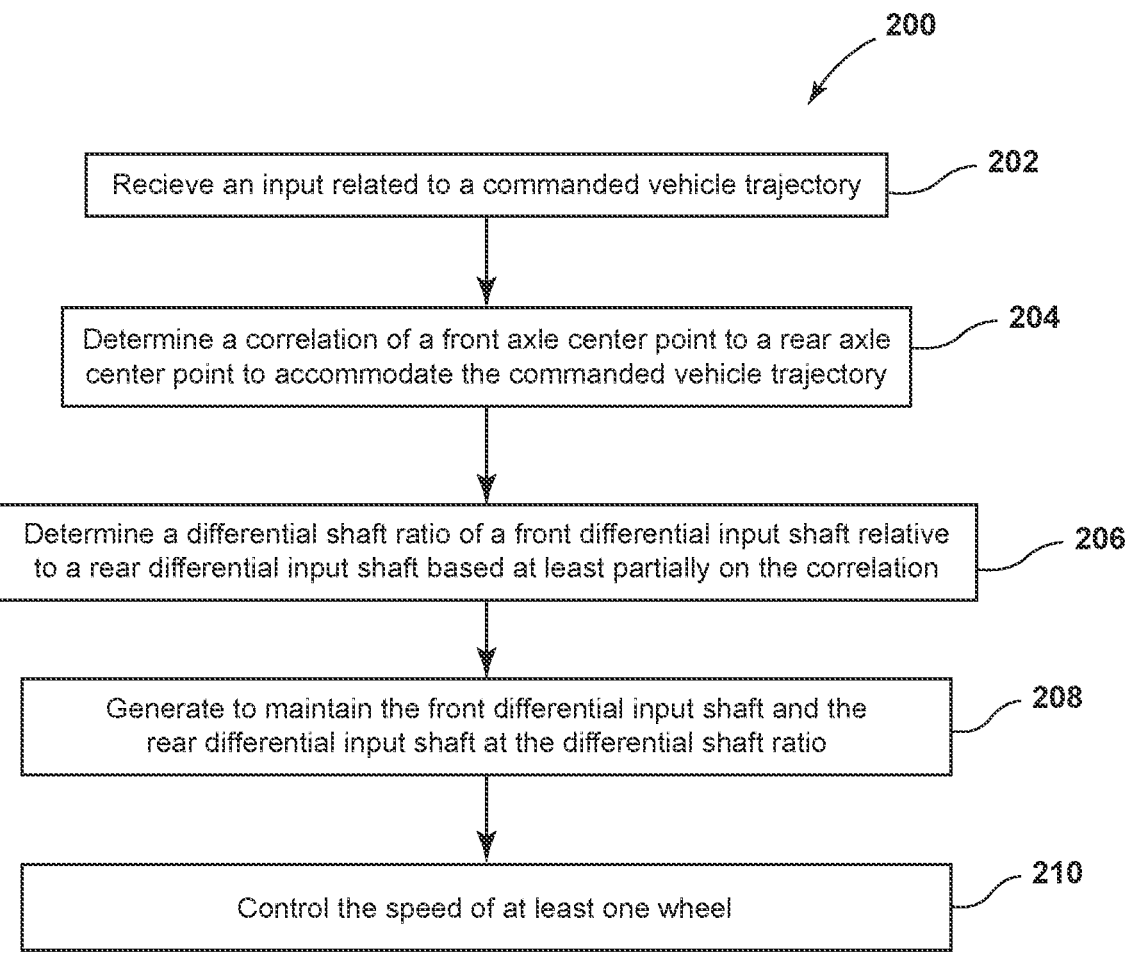

200

Recieve an input related to a commanded vehicle trajectory    202

Determine a correlation of a front axle center point to a rear axle center point to accommodate the commanded vehicle trajectory    204

Determine a differential shaft ratio of a front differential input shaft relative to a rear differential input shaft based at least partially on the correlation    206

Generate to maintain the front differential input shaft and the rear differential input shaft at the differential shaft ratio    208

Control the speed of at least one wheel    210

FIG. 9

DIRECTIONAL BIASED DRIVE CONTROL SYSTEM AND METHOD

FIELD

The present disclosure generally relates to work vehicles and, more particularly, to systems and methods for transferring tractive power of the work vehicle along a commanded trajectory.

BACKGROUND

Various types of work vehicles utilize various drive systems to control the vehicle. When the vehicle initiates a turn, differences between the rotational speeds of laterally offset wheels may be self-regulated through a mechanical differential. However, varied speeds for longitudinally offset wheels through a turn can cause a low traction condition under at least one wheel, which can, in turn, can cause a spin-out condition or other unwanted conditions.

Accordingly, an improved system and method for actuating a drive system would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a drive system for a work vehicle that includes a chassis: a first front wheel and a second front wheel operably coupled with a front axle assembly; and a first rear wheel and a second rear wheel operably coupled with a rear axle assembly. At least one wheel sensor is associated with the first front wheel, the second front wheel, or both. A transfer case is operably coupled with a front differential input shaft and a rear differential input shaft, wherein the front differential input shaft is further operably coupled to the front axle assembly, and wherein the rear differential input shaft is further operably coupled to the rear axle assembly. A computing system is operably coupled with the at least one wheel sensor and the transfer case. The computing system is configured to receive an input related to a commanded vehicle trajectory: determine a correlation of a front axle reference point to a rear axle reference point to accommodate the commanded vehicle trajectory: determine a differential shaft ratio of the front differential input shaft relative to the rear differential input shaft based at least partially on the correlation; and generate instructions for the transfer case to control the front differential input shaft and the rear differential input shaft at respective speeds to maintain the differential shaft ratio.

In some aspects, the present subject matter is directed to a method for operating a work vehicle. The method includes receiving an input, through an input device, related to a commanded vehicle trajectory. The method also includes determining, with a computing system, a correlation of a front axle reference point to a rear axle reference point to accommodate the commanded vehicle trajectory The method further includes determining, with the computing system, a differential shaft ratio of a front differential input shaft relative to a rear differential input shaft based at least partially on the correlation. Lastly, the method includes generating, with the computing system, instructions to maintain the front differential input shaft and a rear differential input shaft at the differential shaft ratio.

In some aspects, the present subject matter is directed to a drive system for a work vehicle includes a first front wheel and a second front wheel operably coupled with a front axle assembly and a first rear wheel and a second rear wheel operably coupled with a rear axle. At least one wheel sensor is associated with at least one of the first front wheel, the second front wheel, the first rear wheel, or the second rear wheel. A differential system is configured to transfer power from a transfer case to the front axle assembly and the rear axle assembly. The differential system comprises a front differential input shaft operably coupled to the transfer case and a front axle assembly and a rear differential input shaft operably coupled to the transfer case and the rear axle assembly. A computing system is operably coupled with the at least one wheel sensor. The computing system is configured to receive an input related to a commanded vehicle trajectory: determine a correlation of a front axle reference point to a rear axle center point to accommodate the commanded vehicle trajectory: determine a differential shaft ratio of the front differential input shaft relative to the rear differential input shaft based at least partially on the correlation; and control the front differential input shaft and the rear differential input shaft at respective speeds to maintain the differential shaft ratio.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 3 is a schematic illustration of the sprayer having a pair of front steered wheels in accordance with aspects of the present subject matter;

FIG. 4 is a schematic illustration of the sprayer having a pair of rear steered wheels in accordance with aspects of the present subject matter:

FIG. 5 is a schematic illustration of the sprayer having a pair of front steered wheels and a pair of rear steered wheels in accordance with aspects of the present subject matter;

FIG. 9 is a flow diagram of a method for operating a work vehicle in accordance with aspects of the present subject matter.

Figure 1:
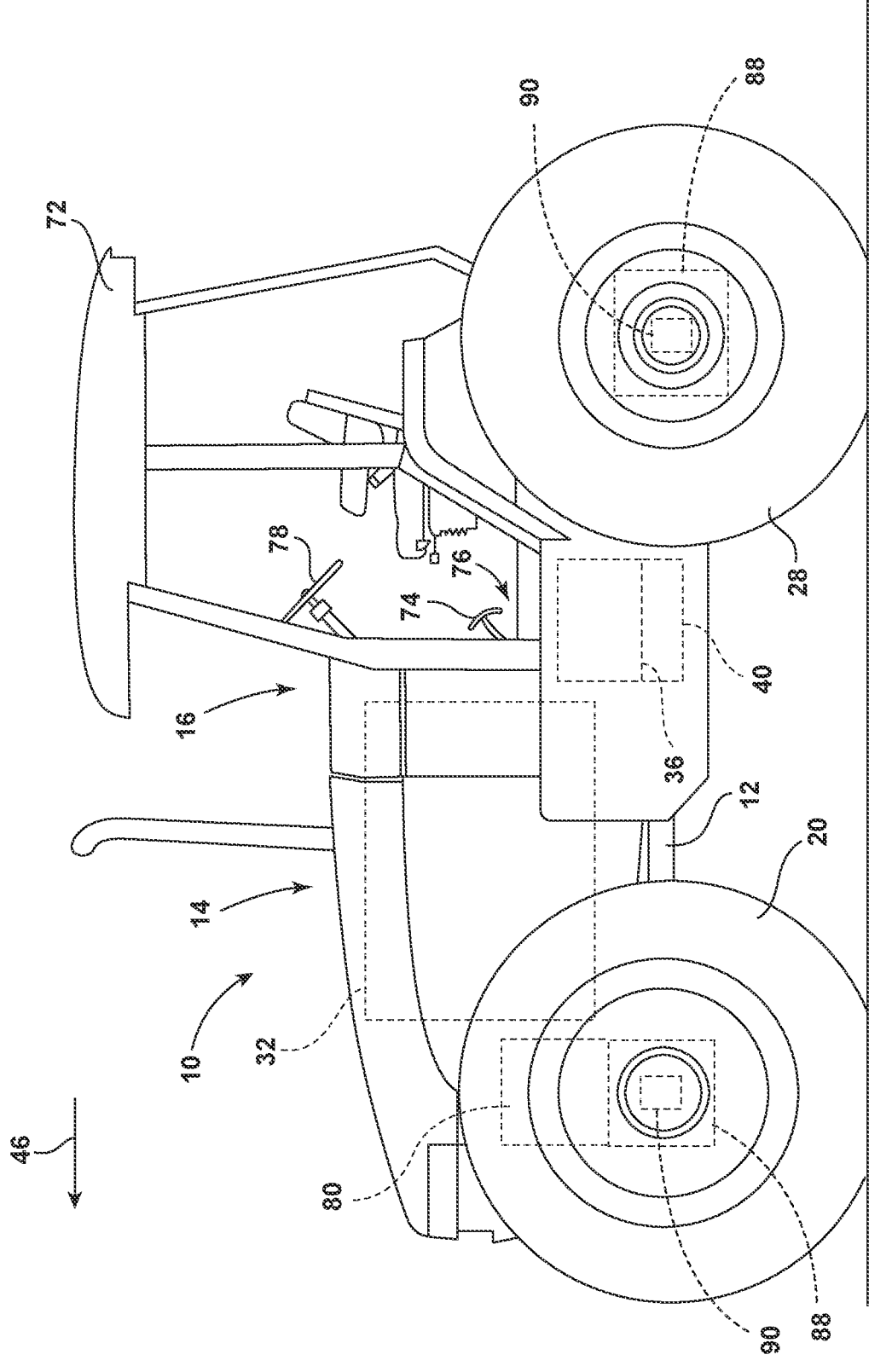
FIG. 1 is a side view of an agricultural work vehicle in accordance with aspects of the present subject matter.

Repeat use of reference characters in the present specification and drawings is intended to represent the same or analogous features or elements of the present technology.

DETAILED DESCRIPTION

Reference now will be made in detail to examples of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another example to yield a still further example. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a power circuit. For example, "upstream" refers to the direction from which a power flows, and "downstream" refers to the direction to which the power moves. The term "selectively." refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified.

In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination: A and C in combination: B and C in combination: or A, B, and C in combination.

In general, the present subject matter is directed to a drive system for a work vehicle. The drive system can include a chassis, a first front wheel and a second front wheel operably coupled with a front axle assembly, and a first rear wheel and a second rear wheel operably coupled with a rear axle assembly. A plurality of wheel sensors can be associated with at least one of the first front wheel, the second front wheel, the first rear wheel, or the second rear wheel. A steering control unit can be operably coupled with a front differential input shaft operably coupled with the front axle assembly and/or a rear differential input shaft operably coupled with the rear axle assembly.

In operation, the system can receive the input from the input devices (e.g., the steering wheel, accelerator, and/or brake pedal) to establish the commanded trajectory and speed of the vehicle. In addition, the system may include a positioning system, such as a global positioning system based on automatic guidance or auto-track system, and the wheel sensors. The wheel sensors can provide data to the system to determine an actual steering angle at each rotational joint associated with each steerable wheel of the vehicle. In turn, the system can determine a correlation of a front axle reference point (e.g., a front axle center point) to a rear axle reference point (e.g., a rear axle center point) to accommodate the commanded vehicle trajectory. The correlation defines a kinematic relationship of the front axle reference point to the rear axle reference point relative to a turning center of the commanded vehicle trajectory. The system may also determine a differential shaft ratio of the front differential input shaft relative to the rear differential input shaft based at least partially on the correlation. Further, the system can generate instructions for the transfer case to control the front differential input shaft and the rear differential input shaft at respective speeds to maintain the differential shaft ratio. As the system described herein allows for each wheel to rotate at the proper speed along the wheel path, each wheel may be neither pushed nor overpowered during operation thereby reducing an amount of dirt being pushed by the wheels. Conversely, in some systems that overspeed the wheels, traction may be affected. However, the system provided herein may mitigate such occurrences. Furthermore, the system provided herein may increase a pulling force at any vehicle trajectory given substantially equal traction conditions under all tractive wheels.

Figure 2:
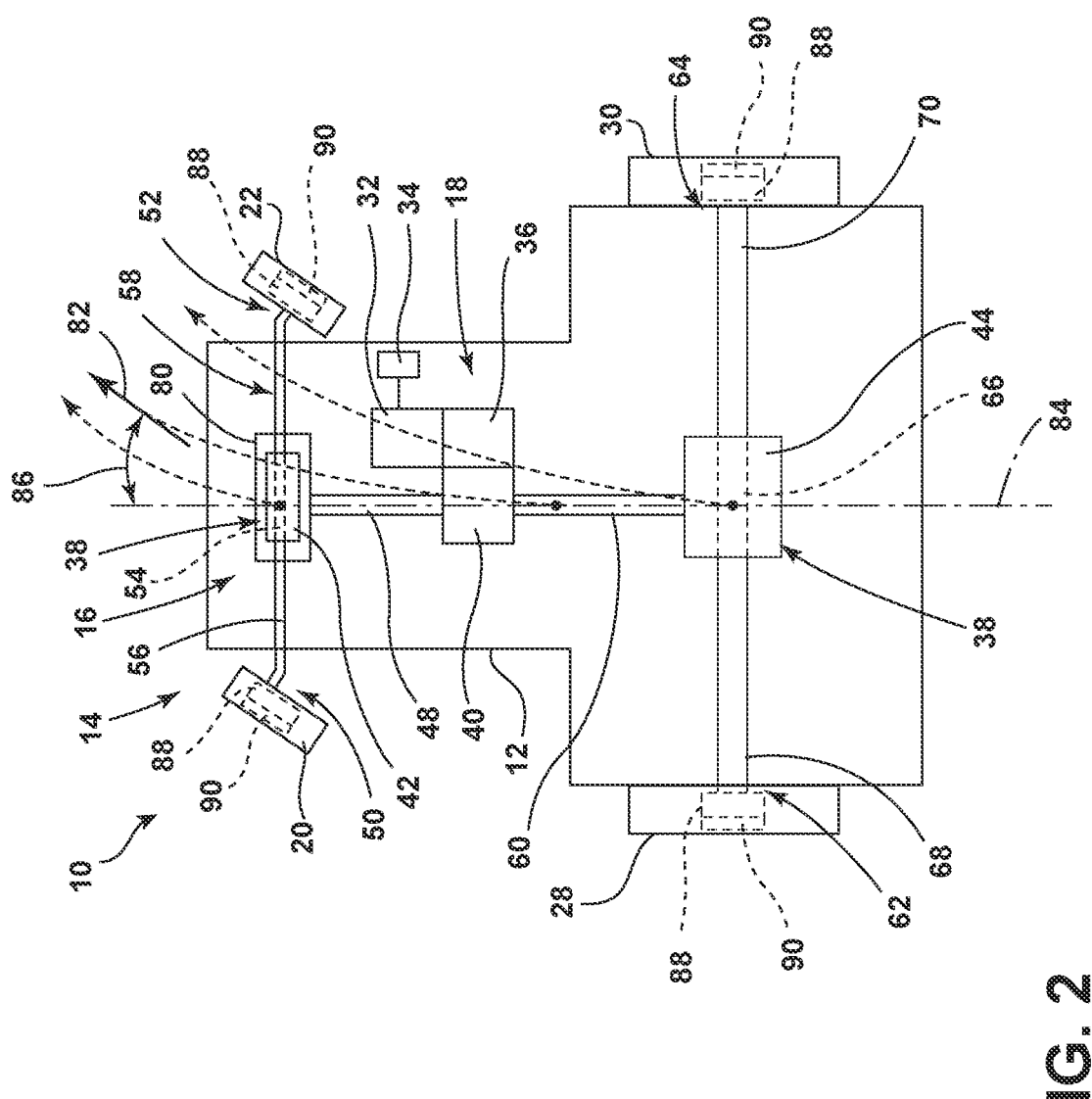
FIG. 2 is a top schematic illustration of the work vehicle in accordance with aspects of the present subject matter.

Referring now to the drawings, FIGS. 1 and 2 illustrate differing views of a work vehicle 10 that is configured as an agricultural tractor. However, in other instances, the work vehicle 10 may be configured as any other suitable work vehicle, including those for agricultural and construction applications, transport, sport, and/or the like.

In some examples, the work vehicle 10 may include a frame or chassis 12 configured to support or couple to a plurality of components. For example, a drive system 14 that includes a steering system 16 that may be operably a front axle assembly 18 that includes a pair of steerable front wheels 20, 22 and a powertrain 24 that may be operably coupled to the front axle assembly 18 and/or a rear axle assembly that includes a pair of driven rear wheels 28, 30. The wheels 20, 22, 28, 30 may be configured to support the work vehicle 10 relative to the ground while the drive system 14 can move the vehicle 10 in a direction of travel (e.g., as indicated by arrow 46 in FIG. 1) across the field.

As shown in FIGS. 2 and 3, the powertrain 24 can include a prime mover 32 and an energy storage device 34. In some examples, the prime mover 32 may be configured as an internal combustion engine and the energy storage device 34 may be configured as a fuel tank. The internal combustion engine may be a spark-ignition internal combustion engine or a compression-ignition internal combustion engine that may use any suitable fuel type (e.g., diesel, ethanol, gasoline, natural gas, propane, etc.). Additionally or alternatively, the drive system 14 may be configured as an electric driveline such that the prime mover 32 is an electric motor and the energy storage device 34 includes a battery system and/or one or more capacitors. Additionally or alternatively, the drive system 14 may be configured as a fuel cell electric driveline such that the prime mover 32 is an electric motor and the energy storage device 34 is a fuel cell (e.g., that stores hydrogen, that produces electricity from the hydrogen, etc.). Additionally or alternatively, the drive system 14 may be configured as a hybrid driveline such that the prime mover 32 includes an internal combustion engine and an electric motor/generator, and the energy storage device 34 includes a fuel tank and/or a battery system. Further, any other type of prime mover and/or energy storage configuration may be used without departing from the scope of the present disclosure.

As shown in FIGS. 2 and 3, the powertrain 24 can include a transmission 36 (e.g., a gearbox, a continuously variable transmission ("CVT"), etc.) that is operably coupled to the prime mover 32. According to various examples, the transmission 36 can have a variety of settings (e.g., gear ratios, etc.) that affect different output speeds thereof based on a mechanical input received thereby from the prime mover 32. In some examples, the prime mover 32 may be coupled with a differential system 38. In such examples, the prime mover 32 or the transmission 36 may drive the front wheels 28, 30 (i.e., a front-wheel-drive vehicle) or the rear wheels 28, 30 (i.e., a rear-wheel-drive vehicle). Alternatively, according to some examples, a transfer case 40 may be operably coupled to the transmission 36 and configured to provide power to a front differential 42 of the differential system 38 and a rear differential 44 of the differential system 38 with the prime mover 32 to facilitate front and rear drive (e.g., an all-wheel-drive vehicle, a four-wheel-drive vehicle, etc.). In such instances, the transfer case 40 may facilitate selectively engaging rear drive only, front drive only, and both front and rear drive simultaneously. In some examples (e.g., in electric driveline configurations, hybrid driveline configurations, etc.), the driveline may be free of the transmission 36.

As shown in FIGS. 1 and 2, a front differential input shaft 48 is operably coupled with the front differential 42 and the transfer case 40 (or the transmission 36). The front axle assembly 18 is coupled to the front differential 42. First and second front wheels 20, 22 are coupled to opposing end portions 50, 52 of the front axle assembly 18. In some examples, the front axle assembly 18 can include a primary shaft 54 and one or more output shafts 56, 58 respectively coupled with the first and second front wheels 20, 22.

A rear differential input shaft 60 is operably coupled with the rear differential 44 and the transfer case 40 (or the transmission 36). The rear axle assembly 26 is coupled to the rear differential 44. First and second rear wheels 28, 30 are coupled to opposing end portions 62, 64 of the rear axle assembly 26. In some examples, the rear axle assembly 26 can include a primary shaft 66 and one or more output shafts 68, 70 respectively coupled with the first and second rear wheels 28, 30.

Additionally, an operator's cab 72 (FIG. 1) may be supported by a portion of the chassis 12 and may house various input devices, such as a brake pedal 74 (FIG. 1) of a braking system 76 and/or a steering wheel 78 (FIG. 1) of the steering system 16, for permitting an operator to control the operation of one or more components of the work vehicle 10. However, it will be appreciated that, in alternative examples, the work vehicle 10 may have any other suitable configuration and/or include any other suitable component (s).

In several examples, the steering system 16 may include a steering actuator 80 configured to adjust the direction of travel 22 of the work vehicle 10. For instance, the direction of travel 22 of the work vehicle 10 may generally correspond to the direction of the steerable wheels 20, 22 (e.g., as indicated by arrow 82 in FIG. 2). In this regard, when the work vehicle 10 is turned or its direction of travel 22 is otherwise changed, the steering actuator 80 may be configured adjust the orientation of the steerable wheels 20, 22 relative to the chassis 12. In several examples, the steering actuator 80 may be configured to pivot or otherwise rotate the steerable wheels 20, 22 relative to the chassis 12 based on a received input (e.g., from the steering wheel 78 (FIG. 2) or control signals from a guidance system, such as a GNSS-based guidance system) in a manner that aligns the direction 82 of the vehicle 10 with the intended direction of travel of the vehicle 10. For example, as shown in FIG. 2, the steerable wheels 20, 22 have been pivoted to the right relative to a longitudinal axis (e.g., as indicated by dashed line 84 in FIG. 1) of the chassis 12. In such instances, the direction of travel 22 of the work vehicle 10 may similarly be oriented to the right, thereby causing the vehicle 10 to turn right. Furthermore, when the work vehicle 10 is being turned, a steering angle (e.g., as indicated by arrow 86 in FIG. 1) may be defined between the direction 82 of the wheels 20, 22 and the longitudinal axis 84 of the chassis 12. Increasing the steering angle 86 may generally decrease the turning radius of the work vehicle 10 (i.e., the turn is "sharper"). Conversely, decreasing the steering angle 86 may generally increase the turning radius of the work vehicle 10 (i.e., the turn is "wider"). It will be appreciated that the steering actuator 80 may correspond to an electric motor, a linear actuator, a hydraulic cylinder, a pneumatic cylinder, or any other suitable actuator coupled to a suitable mechanical linkage or assembly, such as a rack and pinion or a worm gear train.

Furthermore, in several examples, the braking system 76 may include braking devices 88 provided in association with the wheels 20, 22, 28, 30. In this regard, a first braking device 88, when activated, may be configured to reduce the wheel speed or otherwise slow the rotation of an associated first wheel (e.g., 20, 22, 28, 30). Similarly, a second braking device 88, when activated, may be configured to reduce the wheel speed of or otherwise slow the rotation of an associated second wheel (e.g., 20, 22, 28, 30). Moreover, in some examples, the first and second braking devices 88 may be configured for independent activation. That is, each of the first and second braking devices 88 may be activated without also activating the other of the first and second braking devices 88. The braking devices 88 may correspond to any suitable device(s) for reducing the wheel speeds of the wheels (e.g., 20, 22, 28, 30), such as by converting energy associated with the movement of such wheels (e.g., 20, 22, 28, 30) into heat. For example, in various examples, the braking devices 88 may correspond to suitable hydraulic cylinders configured to push stationary frictional elements, such as brake shoes or brake calipers, against rotating elements, such as brake drums or brake discs. However, it will be appreciated that the braking device 88 may correspond to any other suitable hydraulic, pneumatic, mechanical, and/or electrical components.

Referring still to FIGS. 1 and 2, wheel sensors 90 may be provided in operative association with the work vehicle 10. For instance, a first wheel sensor 90 may be provided in operative association with the first wheel 20, a second wheel sensor 90 may be provided in operative association with the second wheel 22, a third wheel sensor 90 may be provided in operative association with the third wheel 28, and/or a fourth wheel sensor 90 may be provided in operative association with the fourth wheel 30. In this regard, each wheel sensor 90 may be configured to detect a parameter associated with the wheel speed of the wheels 20, 22, 28, 30 associated with that respective wheel sensor 90. In various examples, the wheel sensors 90 may be configured as Hall Effect sensors configured to detect the rotational speeds of the wheels 20, 22, 28, 30. However, the wheel speed sensors may correspond to any other suitable types of sensors.

Additionally or alternatively, each wheel sensor 90 may be configured as a position (e.g., wheel angle) sensor that may be configured to detect a parameter associated with an angle defined between the respective wheel 20, 22, 28, 30 and the chassis 12. As such, in some examples, the position sensor may be provided in operative association with the steering actuator 80. For example, the position sensor may be configured as a potentiometer configured to detect relative movement between an associated wheel 20, 22, 28, 30 and the chassis 12. However, it will be appreciated that, in alternative examples, the position sensor may be configured as any other suitable type of sensor. For example, in some examples, the position sensor may be configured as a location sensor, such as a GNSS-based receiver, configured to detect successive locations of the work vehicle 10 within the field. Additionally or alternatively, the position sensor may be configured as an inertial measurement unit configured to detect the lateral acceleration (e.g., the acceleration perpendicular to the direction of travel 22 of the work vehicle 10).

Referring to FIGS. 3-5, various steering systems 16 that may be implemented by the vehicle 10 are schematically illustrated. Specifically, FIG. 3 illustrates the vehicle 10 having a pair of front-steered wheels 20, 22, FIG. 4 illustrates the vehicle 10 having a pair of rear-steered wheels 28,

30, and FIG. 5 illustrates the vehicle 10 having a pair of front-steered wheels 20, 22 and a pair of rear-steered wheels 28, 30.

With further reference to FIG. 4, the vehicle 10 is shown undergoing two-wheel, front-wheel steering toward the right, as indicated by arrow 82. For this right turn, according to Ackerman steering principles, the inside front right wheel 22 is turned at a tighter angle than an outside front left wheel 20, to account for the front right wheel 22 negotiating a tighter radius turn than the outside wheel 20. A radius of rotation of the non-steering wheels 28, 30, a radius of rotation 100 of the front right wheel 22, a radius of rotation 102 of the front left wheel 20, and a radius 104 from a reference location 106 intersect at a turning center 108 (alternatively can be called the "Ackerman center point"). The vehicle 10 rotates about the turning center 108. It will be appreciated that the terms "inside" wheel and "outside" wheel are relative to the turning center 108. As such, when the vehicle 10 makes a right turn, the right wheels are the inside wheels, and the left wheels are the outside wheels. Conversely, when the vehicle 10 makes a left turn, the left wheels are the inside wheels, and the right wheels are the outside wheels.

A steering angle, a, relative to the reference location 106 is defined between the front wheels 20, 22. The reference location 106 is a conceptual point that is used for representing kinematic modeling of the vehicle path relative to that location. In such instances, a steering angle of the vehicle 10 may be calculated from the reference location 106. Based on the position of the front wheels 20, 22 with respect to the reference location 106, steering angles for the steered wheels 20, 22 of the vehicle 10 can be computed. It will be appreciated that to achieve the kinematic modeling discussed herein, certain assumptions may be made with regard to parameters associated with the vehicle 10. Examples of such assumptions include, but are not limited to, the vehicle 10 being operated at a relatively low speed, wheels of the vehicle 10 having negligible (e.g., no) slip, tires of the vehicle 10 having negligible (e.g., no) lateral compliance, tires of the vehicle 10 having negligible (e.g., no) deformation, actuator dynamics of the vehicle 10 being negligible, and the vehicle 10 exhibiting negligible (e.g., no) roll or pitch motions, among other conceivable factors with the potential to affect the vehicle path.

With reference to FIG. 4, a vehicle 10 is shown undergoing two-wheel, rear-wheel steering toward the right, as indicated by arrow 82. In such examples, the reference location 106 may be defined between the left rear wheel 28 and the right rear wheel 30 along the steered assembly. As illustrated, a radius of travel of the non-steering wheels 20, 22, a radius of travel 110 of the rear left wheel 28, a radius of travel 112 of the rear right wheel 30, and a radius 114 from the reference location 106 intersect at a turning center 108.

A steering angle, b, relative to a reference location 106 is defined between the rear wheels 28, 30. The reference location 106 is a conceptual point that is used for representing kinematic modeling of the vehicle path relative to that location. In such instances, a steering angle of the vehicle 10 may be calculated from the reference location 106. Based on the position of the rear wheels 28, 30 with respect to the reference location 106, steering angles for the steered wheels 28, 30 of the vehicle 10 can be computed.

In FIG. 5, a vehicle 10 is shown undergoing four-wheel steering toward the right, as indicated by arrow 82. A radius 116 from the left front wheel 20, a radius 118 from the right front wheel 22, and a radius 120 from the reference location 106 intersect at a turning center 108. Similarly, a radius 126 from the left rear wheel 28, a radius 122 from the right rear wheel 30, and a radius 124 from the reference location 106 may also intersect at a turning center 108.

A steering angle, c, can be computed for the reference location 106, which can be located either between the front wheels 20, 22 or the rear wheels 28, 30. The steering angle is a single angle used to represent the vehicle path. From the steering angle, steering angles for all the wheels 20, 22, 28, 30 can be computed, based on their position with respect to the reference location 106. In FIG. 5, a reference location 106 is shown both in between the front wheels 20, 22 and rear wheels 28, 30 of the vehicle 10. Either position of the reference location 106 can be used. Similarly, for FIGS. 3 and 4, the reference location 106 can be located at a different location than shown. As described above, steering angles are computed for the steered wheels 20, 22, 28, 30 based on the steering angle of the reference location 106 and the location of the steered wheel 20, 22, 28, 30 with respect to the reference location 106. For the turn shown in FIG. 3, the left front wheel 20 travels along a larger diameter circle than the right front wheel 22. Similarly, the left rear wheel 28 travels on a circle of a larger diameter than the right rear wheel 30. It will be appreciated that although the drawings of FIG. 3-5 illustrate various steering systems 16 based on the Ackerman angle, other steering systems 16 are also contemplated without departing from the scope of the present disclosure.

In various examples, a speed ratio of the steered wheels 20, 22, 28, 30 to the non-steered wheels 20, 22, 28, 30 may be determined so that each wheel moves at a defined speed to maintain the vehicle 10 along its commanded trajectory. Additionally or alternatively, a speed ratio of the steered wheels 20, 22, 28, 30 and the non-steered wheels 20, 22, 28, 30 to a reference location 106 may be determined so that each wheel 20, 22, 28, 30 moves at a defined speed ratio to maintain the vehicle 10 along its commanded trajectory. Based on the defined speed ratio, the vehicle 10 may increase or decrease a wheel speed to maintain each defined wheel speed. Once the vehicle 10 receives a subsequent input to alter the direction of the vehicle 10, subsequent speed ratios may be calculated.

Figure 6:
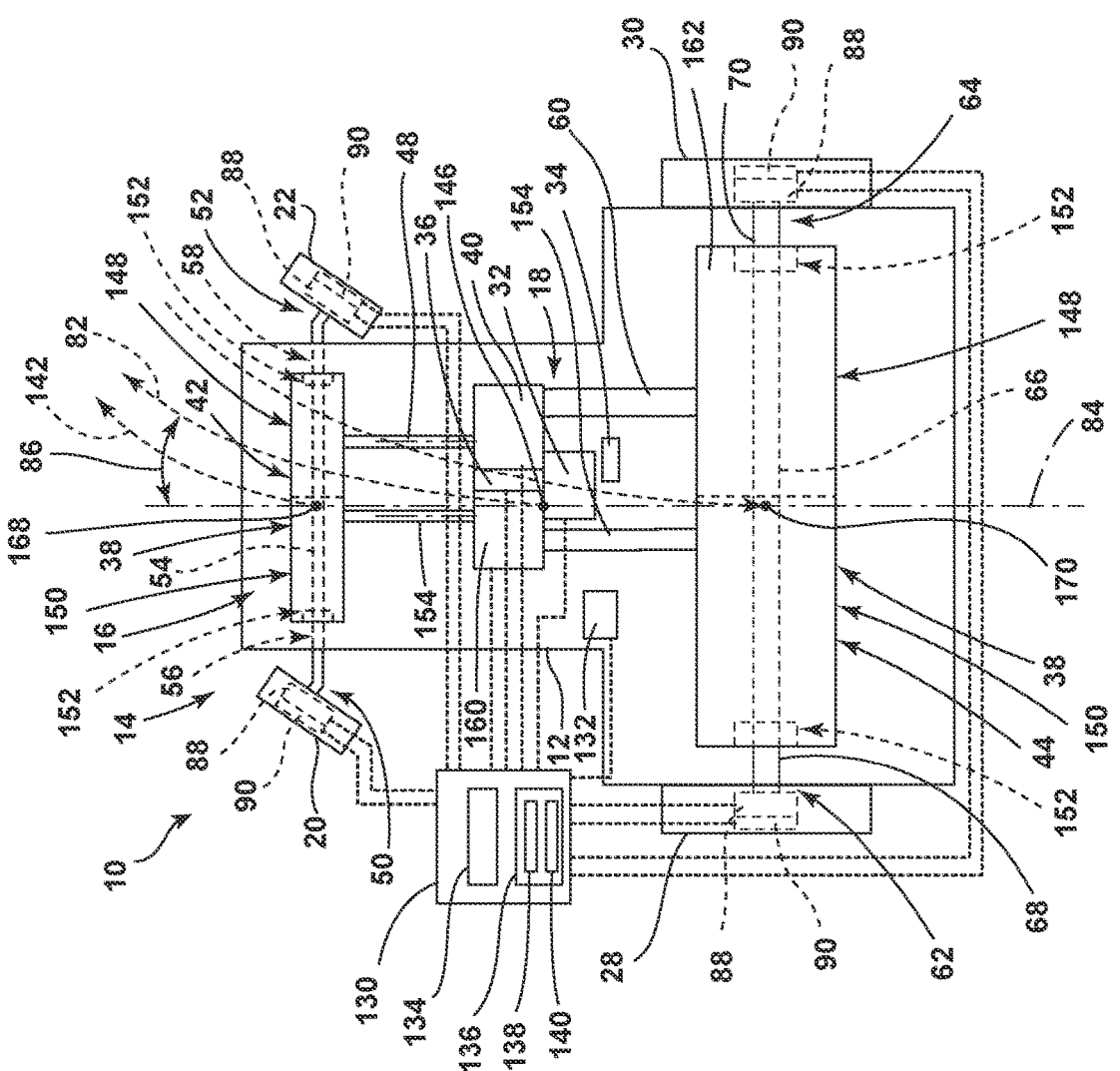
FIG. 6 is a top schematic illustration of the work vehicle in accordance with aspects of the present subject matter.

Referring now to FIG. 6, a schematic view of the drive system 14 for operating the vehicle 10 is illustrated in accordance with aspects of the present subject matter. In general, the system 14 will be described with reference to the vehicle 10 described above with reference to FIGS. 1 and 2. However, it should be appreciated by those of ordinary skill in the art that the disclosed system 14 may generally be utilized with agricultural machines having any other suitable machine configuration. Additionally, it should be appreciated that, for purposes of illustration, communicative links, or electrical couplings of the system 14 shown in FIG. 6 are indicated by dashed lines.

As shown in FIG. 6, the system 14 may include a computing system 130 operably coupled with a positioning system 132, such as a global positioning system based on automatic guidance or auto-track system, and the wheel sensors 90. The wheel sensors 90 can provide data to the guidance system to determine an actual steering angle at each rotational joint associated with each steerable wheel 20, 22 of the vehicle 10. In turn, the system 14 can receive an input related to a commanded vehicle trajectory and/or a speed command for the vehicle 10. In addition, the system 14 can determine a correlation of a front axle reference point 168 (e.g., a front axle center point) to a rear axle reference point 170 (e.g., a rear axle center point) to accommodate the commanded vehicle trajectory at a defined speed. The correlation defines a kinematic relationship of the front axle reference point 168 to the rear axle reference point 170 relative to a turning center 108 (FIGS. 3-5) of the commanded vehicle trajectory. The system 14 may also determine a differential shaft ratio of the front differential input shaft 48 relative to the rear differential input shaft 60 based at least partially on the correlation. Further, the system 14 can generate instructions for the transfer case to control the front differential input shaft 48 and the rear differential input shaft 60 at respective speeds to maintain the differential shaft ratio. The system 14 described herein may allow for the full power of the vehicle 10 to be available for vehicle locomotion as each powered wheel 28, 30 rotates at the expected speed for each wheel 20, 22, 28, 30 based on a position of the wheel 20, 22, 28, 30 relative to the chassis 12 and the commanded vehicle trajectory and the defined speed.

In general, the computing system 130 may comprise any suitable processor-based device, such as a computing device or any suitable combination of computing devices. Thus, in several examples, the computing system 130 may include one or more processors 134 and associated memory 136 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 136 of the computing system 130 may generally comprise memory elements including, but not limited to, a computer-readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 136 may generally be configured to store information accessible to the processor 134, including data 138 that can be retrieved, manipulated, created, and/or stored by the processor 134 and instructions 140 that can be executed by the processor 134, when implemented by the processor 134, configure the computing system 130 to perform various computer-implemented functions, such as one or more aspects of the image processing algorithms and/or related methods described herein. In addition, the computing system 130 may also include various other suitable components, such as a communications circuit or module, one or more input/output channels, a data/control bus, and/or the like.

In various examples, the computing system 130 may correspond to an existing controller of the work vehicle 10, or the computing system 130 may correspond to a separate processing device. For instance, in some examples, the computing system 130 may form all or part of a separate plug-in module or computing device that is installed relative to the vehicle 10 to allow for the disclosed system 14 and method to be implemented without requiring additional software to be uploaded onto existing control devices of the vehicle 10. Further, the various functions of the computing system 130 may be performed by a single processor-based device or may be distributed across any number of processor-based devices, in which instance such devices may be considered to form part of the computing system 130. For instance, the functions of the computing system 130 may be distributed across multiple application-specific controllers.

In various examples, when the vehicle 10 initiates a turn operation, the transfer case 40 may account for speed variations between the front differential input shaft 48 relative to the rear differential input shaft 60. For instance, the system 14 may account for speed variations between the front wheels 20, 22 and the rear wheels 28, 30 due to the offset wheel paths of each respective wheel 20, 22, 28, 30 relative to the turning center 108 (FIGS. 3-5). In such instances, the system 14 may receive an input from one or more input devices (e.g., the steering wheel 78, an accelerator, and/or the brake pedal 74) to establish the commanded trajectory and speed of the vehicle 10 and/or a defined speed of the vehicle 10. In turn, the vehicle 10 may determine a correlation of a front axle reference point path 142 to a rear axle reference point path 170 to cause a reference location (e.g., 146) on the vehicle 10 to move along the commanded trajectory and at the commanded speed. As such, the correlation defines a kinematic relationship of the front axle reference point 168 (and/or any other reference point) to the rear axle reference point 170 (and/or any other reference point) relative to a turning center 108 (and/or any other reference point) of the commanded vehicle trajectory. A differential shaft ratio of the front differential input shaft 48 relative to the rear differential input shaft 60 may be determined based at least partially on the correlation.

In some examples, the system 14 may additionally actively control one or more output shafts 56, 58, 68, 70 respectively coupled with each respective wheel 20, 22, 28, 30. In various examples, each output shaft 56, 58, 68, 70 may be independently driven relative to at least one other wheel 20, 22, 28, 30 to maintain the commanded ground speed of the vehicle 10. Additionally or alternatively, the output shaft 56, 58, 68, 70 may be independently slowed relative to at least one other wheel 20, 22, 28, 30 with a braking device of the braking system 76 to maintain the commanded ground speed of the vehicle 10.

In some cases, a first front wheel 20, 22 during a left-hand turn may rotate at a first commanded speed and a commanded angle relative to the chassis 12 while a first rear wheel 28, 30 on a common side of the vehicle 10 relative to the longitudinal axis may have a second commanded speed that is less than the first commanded speed. The first front wheel 20, 22 during a right-hand turn may be rotated at a third commanded speed while a first rear wheel 28, 30 on a common side of the vehicle 10 relative to the longitudinal axis may have a fourth commanded speed that is less than the third commanded speed. When the first front wheel 20 and the first rear wheel 28 are on the left side of the vehicle 10, the first speed may be less than the third speed, and the second speed may be less than the fourth speed. Conversely, when the first front wheel 22 and the first rear wheel 30 are on the right side of the vehicle 10 the first speed may be greater than the third speed and the second speed may be greater than the fourth speed.

The computing system 130 may utilize any data processing techniques or algorithms, such as by applying corrections or adjustments to the data 138, filtering the data 138 to remove outliers, implementing sub-routines or intermediate calculations, and/or performing any other desired data processing-related techniques or algorithms to determine the correlation of the front axle reference point 168 (e.g., a front axle center point) to the rear axle reference point 170 (e.g., a rear axle center point) relative to a turning center 108 (and/or any other reference point) of the commanded vehicle trajectory, subsequently determine correlations, the differential shaft ratio of the front differential input shaft 48 relative to the rear differential input shaft 60, and/or subsequently determined differential shaft ratios. In various examples, the system 14 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 130 and may be used to generate the correlation, subsequently determine correlations, the differential shaft ratio, and/or subsequent differential shaft ratios. For instance, the computing system 130 may determine a differential shaft ratio and/or subsequent differential shaft ratios based on a commanded trajectory and a commanded speed of the vehicle 10. In turn, the system 14 may monitor and operate each wheel 20, 22, 28, 30 at the determined differential shaft ratio to perform the turn operation. Each change may be fed back into the computing system 130 for use in the generation of subsequent differential shaft ratios to better align the center point 146 of the chassis 12 with a commanded trajectory of the vehicle 10. Such subsequent updates may account for variations and/or degradation of various components of the vehicle 10 during use thereof.

Figure 7:
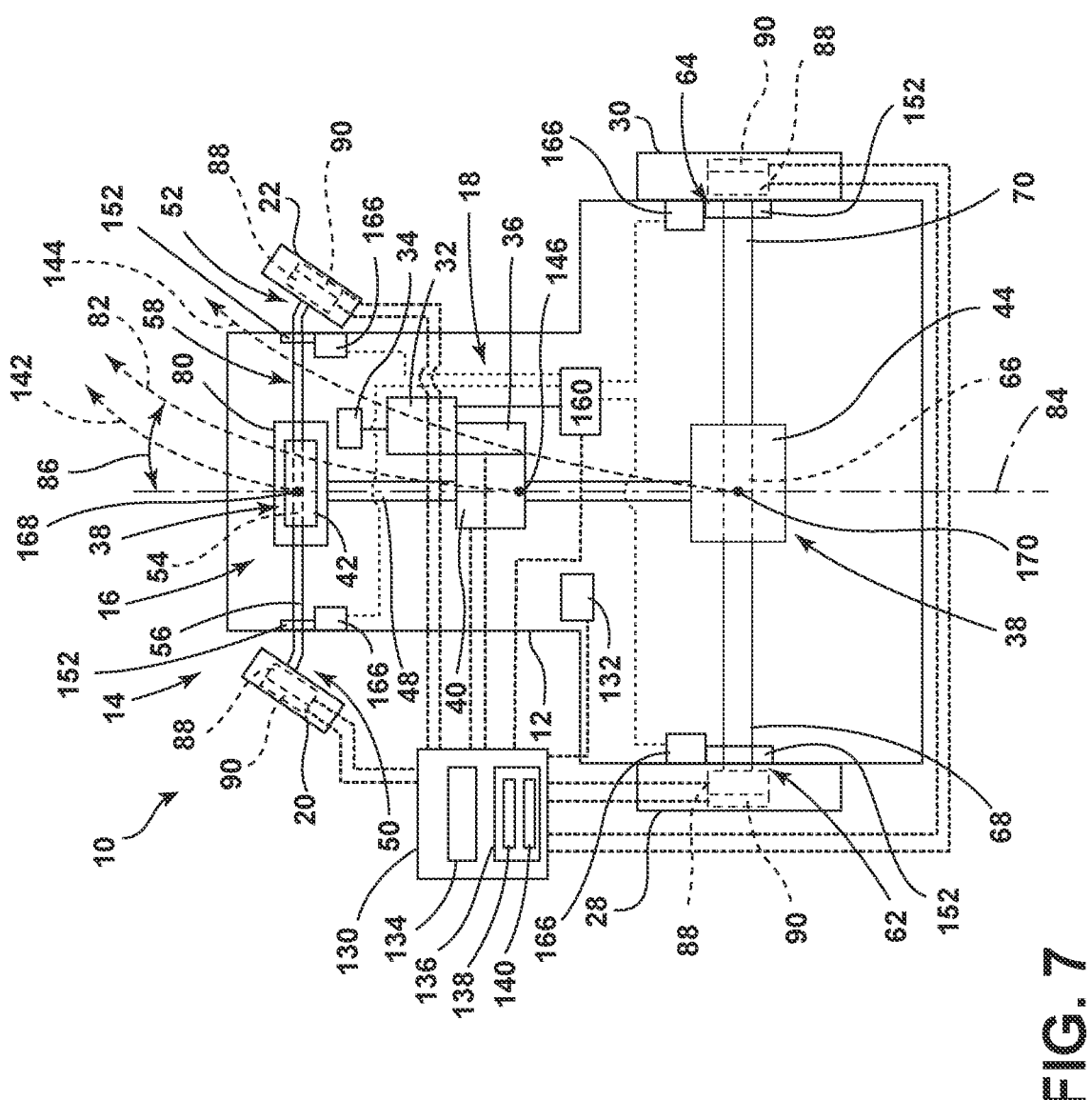
FIG. 7 is a top schematic illustration of the work vehicle in accordance with aspects of the present subject matter.

Referring further to FIGS. 6 and 7, in some examples, a double differential system 38 may be implemented to maintain each wheel speed in addition to maintaining a differential shaft ratio (or instead of maintaining a differential shaft ratio). In such instances, a first differential 148 can deliver the pulling power of the work vehicle 10 to the powered wheels 20, 22, 28, 30 and a second differential 150 can provide power to a gear train 152 to maintain a defined speed of each wheel 20, 22, 28, 30, such as one or more ring gears of a final planetary reduction drive on both side portions of the first differential 148. In some cases, corrective instructions may be provided to a final drive planetary ring gears of the second differential 150.

In some examples, such as the one illustrated in FIG. 6, a first front differential input shaft 48 may operably couple the transfer case 40 or the transmission 36 to a first differential 148 of the front differential 42 to provide the pulling power of the work vehicle 10 to the powered wheels 20, 22. A driveshaft 154 may operably couple a steering control unit 160 with a second differential 150 of the front differential 42 to provide power to the gear train 152, such as one or more ring gears of a final planetary reduction drive on both side portions of the differential system 38. In various examples, each of the front wheels 20, 22 may be operated at a commanded speed independently of the other wheel 20, 22 and based on the commanded trajectory and speed of the vehicle 10.

Additionally or alternatively, a first rear differential input shaft may operably couple the transfer case 40 or transmission 36 to a first differential 148 of a rear differential 44 to provide the pulling power of the work vehicle 10 to the powered wheels 28, 30. A driveshaft 154 may operably couple a steering control unit 160 with a second differential 150 of the rear differential 44 to provide power to the gear train 152, such as one or more ring gears of a final planetary reduction drive on both side portions of the first differential 148. In various examples, each of the rear wheels 28, 30 may be operated at a commanded speed independently of the other wheel 28, 30 and based on the commanded trajectory and speed of the vehicle 10.

With reference to FIG. 7, in some examples, the gear trains 152, such as the ring gears of the final planetary reduction drives, can be driven by independently actuated motors 166. The motors 166 may be configured as electric motors, hydraulic motors, and/or any other device to power the ring gears at a speed to effectively attain the commanded individual wheel speeds per the commanded vehicle speed and trajectory. In instances in which the motors 166 are configured as hydraulic motors, the steering control unit 160 may include a pump that powers each of the hydraulic motors. Alternatively, in instances in which the motors 166 are configured as electric motors, the steering control unit 160 may include a generator that powers each of the electric motors, or the electric motors 166 are powered from a single power source but the power to each motor is controlled by a steering control unit 160 with input from the wheel sensors 90 to determine the target speed of each wheel 20, 22, 28, 30 depending on wheel position, desired trajectory, and/or speed.

As illustrated in FIG. 7, in some examples, a first front gear train 152 can be operably coupled with the first front wheel 20, 22. In addition, a first front motor 166 can be operably coupled with the first front gear train 152 and configured to alter a relative speed of a first front output shaft 56, 58 coupled to the first front wheel 20, 22 from the front axle assembly 18. Similarly, a second front gear train 152 can be operably coupled with the second front wheel 20, 22. A second front motor 166 can be operably coupled with the second front gear train 152 and configured to alter a relative speed of a second front output shaft 56, 58 coupled to the second front wheel 20, 22 from the front axle assembly 18. In various examples, the steering control unit 160 can be configured to alter a rotational speed of the first front output shaft 56, 58 through the actuation of the first gear train 152 by the first front motor 166 and a rotational speed of the second front output shaft 56, 58 through actuation of the second gear train 152 by the second front motor 166.

Additionally or alternatively, a first rear gear train 152 can be operably coupled with the first rear wheel 28, 30. A first rear motor 166 can be operably coupled with the first rear gear train 152 and configured to alter a relative speed of a first rear output shaft 68, 70 coupled to the first rear wheel 28, 30 from the rear assembly. Similarly, a second rear gear train 152 can be operably coupled with the second rear wheel 28, 30. A second rear motor 166 can be operably coupled with the second rear gear train 152 and configured to alter a relative speed of a second rear output shaft 68, 70 coupled to the second rear wheel 28, 30 from the rear assembly. In various cases, the steering control unit 160 can be configured to alter a rotational speed of the first rear output shaft 68, 70 through the actuation of the first gear train 152 by the first rear motor 166 and a rotational speed of the second rear output shaft 68, 70 through actuation of the second gear train 152 by the second rear motor 166.

Figure 8:
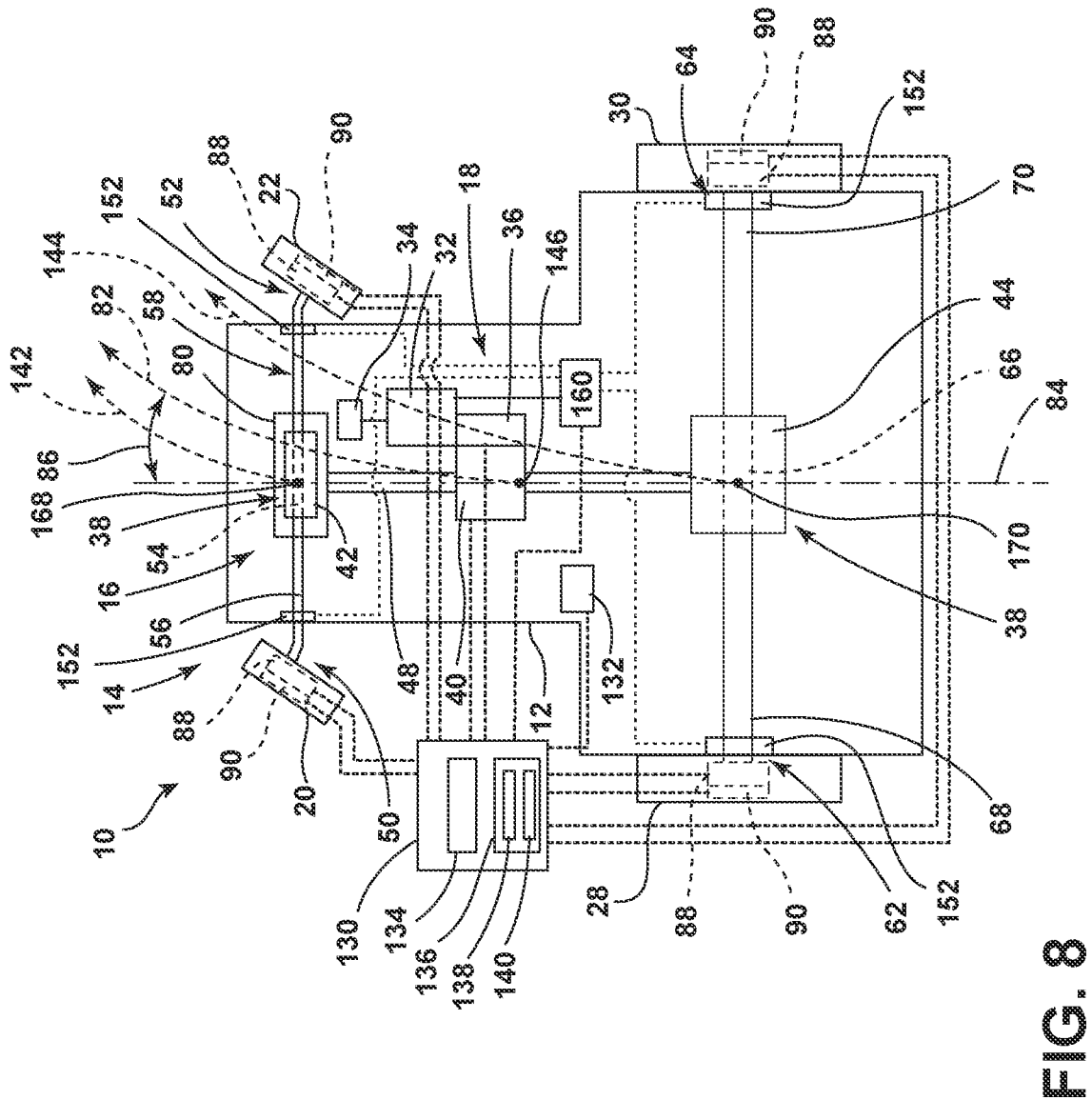
FIG. 8 is a top schematic illustration of the work vehicle in accordance with aspects of the present subject matter.

Referring further to FIG. 8, the system 14 may limit the speed of each wheel 20, 22, 28, 30 to the commanded speed based on the position of the wheel 20, 22, 28, 30 relative to a center point 146, a vehicle speed, and a trajectory to maintain each wheel speed in addition to maintaining a differential shaft ratio (or instead of maintaining a differential shaft ratio). In some instances, by using a combination of wheel sensors 90, respective braking devices 88 (e.g., proportionally controlled friction brakes or liquid-based torque converters associated with each axle assembly 18, 26), and the steering control unit 160, the speed of at least one wheel 20, 22, 28, 30 may be reduced to maintain the vehicle 10 along the commanded trajectory. In examples utilizing a liquid-based torque converter, the fluid used in the torque converter may exhibit characteristics of an electro-magnetic fluid thereby allowing the viscosity of the fluid to be predictably varied by applying specific electric power from the steering control unit 160.

Referring now to FIG. 9, a flow diagram of some examples of a method 200 for operating a work vehicle is illustrated in accordance with aspects of the present subject matter. In general, the method 200 will be described herein with reference to the drive system implemented on the work vehicle 10 described above with reference to FIGS. 1-8. However, the disclosed method 200 may generally be utilized with any suitable agricultural work vehicle 10 and/or may be utilized in connection with a drive system having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 can include receiving an input related to a commanded vehicle trajectory through an input device. As provided herein, the input device may be received by a steering wheel and/or as control signals from a GNSS-based guidance system. Additionally or alternatively, the input device may include a braking device and/or any other component of a braking system. In some instances, a first wheel sensor is configured to detect the actual wheel speed of the first front wheel, a second wheel sensor is configured to detect the actual wheel speed of the second front wheel, a third wheel sensor is configured to detect the actual wheel speed of the first rear wheel, and a fourth wheel sensor is configured to detect the actual wheel speed of the second rear wheel.

At (204), the method 200 can include determining a correlation of a front axle reference point to a rear axle reference point to accommodate the commanded vehicle trajectory with a computing system. As provided herein, the correlation defines a kinematic relationship of the front axle reference point 168 to the rear axle reference point 170 relative to a turning center 108 (and/or any other reference point) of the commanded vehicle trajectory. In some examples, the correlation is based at least partially on a known distance of each wheel from a centerline of the vehicle.

At (206), the method 200 can include determining a differential shaft ratio of a front differential input shaft relative to a rear differential input shaft based at least partially on the correlation with the computing system.

At (208), the method 200 can include generating instructions to maintain the front differential input shaft and the rear differential input shaft at the differential shaft ratio with the computing system.

At (210), the method 200 can include controlling the speed of at least one of the first front wheel, the second front wheel, the first rear wheel, or the second rear wheel. In various examples, controlling the speed of at least one of the first front wheel, the second front wheel, the first rear wheel, or the second rear wheel may be accomplished through a steering control unit and/or a braking system.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A drive system for a work vehicle, the drive system comprising:
a chassis;
a first front wheel and a second front wheel operably coupled with a front axle assembly;
a first rear wheel and a second rear wheel operably coupled with a rear axle assembly;
at least one wheel sensor associated with the first front wheel, the second front wheel, or both;
a first rear gear train operably coupled with the first rear wheel;
a first rear motor operably coupled with the first rear gear train and configured to alter a relative speed of a first rear differential input shaft coupled to the first rear wheel from the rear axle;
a second rear gear train operably coupled with the second rear wheel;
a second rear motor operably coupled with the second rear gear train and configured to alter a relative speed of a second rear differential input shaft coupled to the second rear wheel from the rear axle;
a steering control unit configured to alter a rotational speed of the first rear differential input shaft through an actuation of the first gear train by the first rear motor and a rotational speed of the second rear differential input shaft through an actuation of the second gear train by the second rear motor;
a transfer case operably coupled with a front differential input shaft and a rear differential input shaft, wherein the front differential input shaft is further operably coupled to the front axle assembly, and wherein the rear differential input shaft is further operably coupled to the rear axle assembly; and
a computing system operably coupled with the at least one wheel sensor and the transfer case, the computing system being configured to:
receive an input related to a commanded vehicle trajectory;
determine a correlation of a front axle reference point to a rear axle reference point to accommodate the commanded vehicle trajectory;
determine a differential shaft ratio of the front differential input shaft relative to the rear differential input shaft based at least partially on the correlation; and
generate instructions for the transfer case to control the front differential input shaft and the rear differential input shaft at respective speeds to maintain the differential shaft ratio.

2. The system of claim 1, wherein the correlation defines a kinematic relationship of the front axle reference point to the rear axle reference point relative to a turning center of the commanded vehicle trajectory.

3. The system of claim 1, wherein the at least one wheel sensor includes a first wheel sensor configured to detect an actual wheel speed of the first front wheel and a second wheel sensor configured to detect an actual wheel speed of the second front wheel.

4. The system of claim 1, wherein the instructions are based at least partially on a known distance of each wheel from a centerline of the vehicle.

5. The system of claim 1, wherein a first differential is operably coupled between the front differential input shaft and the front axle assembly, and a second differential is operably coupled between the rear differential input shaft and the rear axle assembly.

6. The system of claim 1, further comprising:
a first front gear train operably coupled with the first front wheel;
a first front motor operably coupled with the first front gear train and configured to alter a relative speed of a first front differential input shaft coupled to the first front wheel from the front axle assembly;
a second front gear train operably coupled with the second front wheel;
a second front motor operably coupled with the second front gear train and configured to alter a relative speed of a second front differential input shaft coupled to the second front wheel from the front axle assembly; and
a steering control unit configured to alter a rotational speed of the first front differential input shaft through an actuation of the first gear train by the first front motor and a rotational speed of the second front differential input shaft through an actuation of the second gear train by the second front motor.

7. The system of claim 1, further comprising:
a steering control unit configured to control the speed of at least one of the first front wheel, the second front wheel, the first rear wheel, or the second rear wheel through a braking system.

8. A method for operating a work vehicle, the method comprising:
receiving an input, through an input device, related to a commanded vehicle trajectory;
determining, with a computing system, a correlation of a front axle reference point to a rear axle reference point to accommodate the commanded vehicle trajectory;

determining, with the computing system, a differential shaft ratio of a front differential input shaft relative to a rear differential input shaft based at least partially on the correlation; and generating, with the computing system, instructions to maintain the front differential input shaft and a rear differential input shaft at the differential shaft ratio; and controlling, through a steering control unit, a rotational speed of a first front differential input shaft through an actuation of a first gear train by a first front motor and a rotational speed of a second front differential input shaft through an actuation of a second gear train by a second front motor.

9. The method of claim 8, wherein the correlation defines a kinematic relationship of the front axle reference point to the rear axle reference point relative to a turning center of the commanded vehicle trajectory.

10. The method of claim 9, wherein the correlation is based at least partially on a known distance of each wheel from a centerline of the vehicle.

11. The method of claim 10, wherein a first wheel sensor is configured to detect an actual wheel speed of a first front wheel, a second wheel sensor configured to detect an actual wheel speed of a second front wheel, a third wheel sensor configured to detect an actual wheel speed of a first rear wheel, and a fourth wheel sensor configured to detect an actual wheel speed of a second rear wheel.

12. The method of claim 11, further comprising:

controlling, through a braking system, the speed of at least one of the first front wheel, the second front wheel, the first rear wheel, or the second rear wheel.

13. The method of claim 9, wherein the instructions are based at least partially on a known distance of each wheel from a centerline of the vehicle.

14. A drive system for a work vehicle, the drive system comprising:

a first front wheel and a second front wheel operably coupled with a front axle assembly;

a first rear wheel and a second rear wheel operably coupled with a rear axle;

at least one wheel sensor associated with at least one of the first front wheel, the second front wheel, the first rear wheel, or the second rear wheel;

a differential system configured to transfer power from a transfer case to the front axle assembly and the rear axle assembly, the differential system comprising:

a front differential input shaft operably coupled to the transfer case and a front axle assembly; and a rear differential input shaft operably coupled to the transfer case and the rear axle assembly; and a computing system operably coupled with the at least one wheel sensor, the computing system being configured to:

receive an input related to a commanded vehicle trajectory;

determine a correlation of a front axle reference point to a rear axle center point to accommodate the commanded vehicle trajectory at a defined speed;

determine a differential shaft ratio of the front differential input shaft relative to the rear differential input shaft based at least partially on the correlation; and control a rotational speed of the front differential input shaft through an actuation of a first gear train and a rotational speed of the rear differential input shaft through an actuation of a second gear train at respective speeds to maintain the differential shaft ratio.

15. The system of claim 14, wherein the correlation defines a kinematic relationship of the front axle reference point to the rear axle reference point relative to a turning center of the commanded vehicle trajectory.

16. The system of claim 14, wherein the at least one wheel sensor includes a first wheel sensor configured to detect an actual wheel speed of the first front wheel and a second wheel sensor configured to detect an actual wheel speed of the second front wheel.

17. The system of claim 14, wherein the differential shaft ratio is based at least partially on a known distance of each wheel from a centerline of the vehicle.

18. The system of claim 14, further comprising:

a steering control unit configured to control the speed of at least one of the first front wheel, the second front wheel, the first rear wheel, or the second rear wheel through a braking system.

* * * * *